US012529430B2

(12) United States Patent
Yeh et al.

(10) Patent No.: US 12,529,430 B2
(45) Date of Patent: Jan. 20, 2026

(54) PROPORTIONAL VALVE

(71) Applicant: COOLER MASTER CO., LTD., Taipei (TW)

(72) Inventors: Chiu Yu Yeh, Taipei (TW); Wen-Hsien Lin, Taipei (TW); Wen-Hung Chen, Taipei (TW)

(73) Assignee: COOLER MASTER CO., LTD., Taipei (TW)

( * ) Notice: Subject to any disclaimer, the term of this patent is extended or adjusted under 35 U.S.C. 154(b) by 136 days.

(21) Appl. No.: 17/980,483

(22) Filed: Nov. 3, 2022

(65) Prior Publication Data

US 2024/0102561 A1    Mar. 28, 2024

(30) Foreign Application Priority Data

Sep. 28, 2022   (TW) .................................. 111210566

(51) Int. Cl.
| | | |
|---|---|---|
| *F16K 11/074* | (2006.01) | |
| *F16K 27/04* | (2006.01) | |
| *F16K 31/04* | (2006.01) | |

(52) U.S. Cl.
CPC ........ *F16K 11/0743* (2013.01); *F16K 27/045* (2013.01); *F16K 27/048* (2013.01); *F16K 31/041* (2013.01)

(58) Field of Classification Search
CPC .. F16K 11/0743; F16K 27/045; F16K 27/048; F16K 31/041
See application file for complete search history.

(56) References Cited

U.S. PATENT DOCUMENTS 3,756,275 A * 9/1973 Barrera ............... F16K 11/0743
137/590
4,383,234 A * 5/1983 Yatsushiro ............ H01F 7/1615
335/255

(Continued)

FOREIGN PATENT DOCUMENTS

DE    41 39 815 B4    11/2005
EP    0 063 627 A1    11/1982

OTHER PUBLICATIONS

Extended European Search Report dated Feb. 26, 2024 as received in Application No. 23168927.4.

*Primary Examiner* — Craig M Schneider
*Assistant Examiner* — Christopher D Ballman
(74) *Attorney, Agent, or Firm* — Merchant & Gould P.C.

(57) ABSTRACT

A proportional valve includes a casing and a valve trim. The casing has at least one fluid inlet, a fluid outlet, at least one first connection passageway, at least one second connection passageway and an accommodating space. The first connection passageway is connected with the fluid inlet. The second connection passageway is connected with the fluid outlet. The valve trim is located in the accommodating space, including a flow splitter an adjusting rotor. The flow splitter has at least one third connection passageway and at least one fourth connection passageway. The third connection passageway is connected with the first connection passageway. The fourth connection passageway is connected with the second connection passageway. The adjusting rotor has a channel and at least one blocking portion. The adjusting rotor is rotatably disposed on the flow splitter so that the blocking portion blocks a part of the third connection passageway.

12 Claims, 10 Drawing Sheets

(56) References Cited

U.S. PATENT DOCUMENTS

| | | | | |
|---|---|---|---|---|
| 5,398,717 A * | 3/1995 | Goncze | F16K 3/08 | 251/288 |
| 5,741,005 A * | 4/1998 | Vaughan | C02F 1/42 | 251/208 |
| 6,598,851 B2 * | 7/2003 | Schiavone | F16K 31/041 | 251/129.11 |
| 6,871,803 B1 * | 3/2005 | Ohmi | F16K 7/16 | 239/596 |
| 7,080,790 B2 * | 7/2006 | Lorch | F16K 11/0743 | 236/12.2 |
| 7,631,505 B2 * | 12/2009 | Seitz | F25B 9/14 | 251/304 |
| 8,166,992 B2 * | 5/2012 | Samaroo | B09C 1/02 | 137/624.13 |
| 8,857,469 B2 * | 10/2014 | Wang | F16K 35/04 | 251/297 |
| 9,611,942 B2 * | 4/2017 | Schubert | G01N 30/20 | |
| 9,638,340 B2 * | 5/2017 | Bachofer | F16K 11/0743 | |
| 9,739,382 B2 * | 8/2017 | Laird | F04B 13/02 | |
| 9,803,635 B2 * | 10/2017 | Kato | F04B 19/22 | |
| 9,803,759 B2 * | 10/2017 | Bachofer | F16K 11/0743 | |
| 9,803,760 B2 * | 10/2017 | Morein | F16K 11/0853 | |
| 9,874,284 B2 * | 1/2018 | Bachofer | F16K 11/0746 | |
| 10,124,335 B2 * | 11/2018 | Liang | F16K 99/0028 | |
| 10,161,535 B2 * | 12/2018 | Sansum | G05D 23/1313 | |
| 10,344,877 B2 * | 7/2019 | Roche | B60L 1/003 | |
| 10,641,397 B2 * | 5/2020 | Bjerrehorn | F16K 1/44 | |
| 10,914,390 B2 * | 2/2021 | Chapman | F16K 5/0478 | |
| 10,941,871 B2 * | 3/2021 | Yu | F16K 27/048 | |
| 11,002,375 B2 * | 5/2021 | Marchand | F16K 11/0712 | |
| 11,306,825 B2 * | 4/2022 | Deperraz | F16K 1/44 | |
| 11,572,957 B2 * | 2/2023 | Chapman | F16K 27/06 | |
| 2003/0145889 A1 | 8/2003 | Knapp | | |
| 2004/0240179 A1 * | 12/2004 | Koga | H01L 23/473 | 257/E23.098 |
| 2007/0068583 A1 * | 3/2007 | Johnson | F16K 31/043 | 137/625.31 |
| 2007/0231135 A1 * | 10/2007 | Wampler | F04D 29/0476 | 415/229 |
| 2010/0059425 A1 * | 3/2010 | Roig | C02F 1/42 | 210/105 |
| 2010/0301250 A1 * | 12/2010 | Kee | F16K 3/08 | 251/309 |
| 2011/0120574 A1 | 5/2011 | Chen | | |
| 2013/0225910 A1 * | 8/2013 | Woodard | F16C 32/044 | 29/889.7 |
| 2014/0205480 A1 * | 7/2014 | Nakano | F04D 29/4293 | 417/420 |
| 2014/0369824 A1 * | 12/2014 | Guo | F04D 29/445 | 415/204 |
| 2015/0010392 A1 * | 1/2015 | Lazich | F04D 29/426 | 415/214.1 |
| 2015/0233476 A1 * | 8/2015 | Bachofer | F16J 15/447 | 251/319 |
| 2016/0025099 A1 * | 1/2016 | Nakagawa | F04D 29/4266 | 417/423.7 |
| 2016/0279376 A1 * | 9/2016 | Cewers | A61M 16/206 | |
| 2016/0289931 A1 | 10/2016 | Chang | | |
| 2017/0108127 A1 | 4/2017 | Chang | | |
| 2017/0130861 A1 * | 5/2017 | Deperraz | F16K 1/54 | |
| 2017/0165602 A1 * | 6/2017 | Postage | B65D 81/26 | |
| 2019/0136988 A1 * | 5/2019 | Mizuno | B60S 1/481 | |
| 2019/0316594 A1 * | 10/2019 | Hattori | F04D 13/0633 | |
| 2020/0191161 A1 * | 6/2020 | Svarre | F04D 13/0606 | |
| 2020/0191166 A1 * | 6/2020 | Svarre | F04D 29/026 | |
| 2020/0362973 A1 * | 11/2020 | Kennedy | F16K 11/0743 | |
| 2022/0381352 A1 * | 12/2022 | Chang | F16K 11/0743 | |

* cited by examiner

PROPORTIONAL VALVE

CROSS-REFERENCE TO RELATED APPLICATIONS

This non-provisional application claims priority under 35 U.S.C. § 119(a) on Patent Application No(s). 111210566 filed in ROC, on Sep. 28, 2022, the entire contents of which are hereby incorporated by reference.

TECHNICAL FIELD

The present disclosure relates to a proportional valve, more particularly to a proportional valve which controls a fluid flow in a casing via a flow splitter and an adjusting rotor thereof.

BACKGROUND

Generally, in order to adjust the fluid flow in a fluid flow system, a control valve will be set to prevent excessive fluid flow therein. There are many types of control valves, such as a manually controlled throttle valve, an electrically controlled servo valve or an electrically controlled proportional valve. The throttle valve needs to be manually controlled, which is inconvenient in operation than the electric controlled valves. As for the electrically controlled valves, although the servo valve has high fluid flow control accuracy, it consumes a lot of energy and is expensive. The proportional valve is inexpensive to be set up and also accurately controls of fluid flow. Therefore, in general, the proportional valve is used for controlling the fluid flow.

The conventional proportional valve generally controls the valve trim via a spring in the casing thereof. However, after the proportional valve is used for many times, the spring will have a problem of elastic fatigue, which reduces the accuracy of the proportional valve in controlling the fluid flow. Therefore, how to extend the lifespan of the proportional valve and maintain the high-precision control of the fluid flow after the proportional valve is used for many times is an important issue to be solved.

SUMMARY

The present disclosure provides a proportional valve so as to control a fluid flow in a casing via a flow splitter and an adjusting rotor thereof, thereby extending the lifespan of the proportional valve and enabling the proportional valve to maintain high-precision control of fluid flow after the proportional valve is used for many times.

One embodiment of the disclosure provides a proportional valve including a casing and a valve trim. The casing has at least one fluid inlet, a fluid outlet, at least one first connection passageway, at least one second connection passageway and an accommodating space. The at least one first connection passageway is in fluid communication with the fluid inlet, and the at least one second connection passageway is in fluid communication with the fluid outlet. The accommodating space is in fluid communication with the at least one first connection passageway and the at least one second connection passageway. The valve trim is located in the accommodating space of the casing. The valve trim includes a flow splitter and an adjusting rotor. The flow splitter has at least one third connection passageway and at least one fourth connection passageway. The at least one third connection passageway is in fluid communication with the at least one first connection passageway, and the at least one fourth connection passageway is in fluid communication with the at least one second connection passageway. The adjusting rotor has a channel and at least one blocking portion. The channel is in fluid communication with the at least one third connection passageway and the at least one fourth connection passageway. The at least one blocking portion corresponds to the at least one third connection passageway. The adjusting rotor is rotatably disposed on the flow splitter so that the at least one blocking portion blocks a part of the at least one third connection passageway to adjust an overlapping area between the channel and the at least one third connection passageway.

According to the proportional valve as described above, it adjusts the fluid flow via the flow splitter and the adjusting rotor thereof. When the blocking portion of the adjusting rotor does not block the at least one third connection passageway, the at least one fluid inlet, the at least one first connection passageway, the at least one third connection passageway, the at least one fourth connection passageway, the at least one second connection passageway and the fluid outlet can form a fluid passage, such that the fluid can flow smoothly. When the blocking portion of the adjusting rotor blocks the two third connection passageways, the blocking portion blocks the fluid communication between the third connection passageway and the channel, so that the fluid cannot flow through. Compared with the conventional proportional valve that uses the elastic force of the spring to control the opening degree of the valve trim, the proportional valve as described above does not use the elastic force of the spring to control the opening degree of the valve trim, but controls the opening degree of the valve trim via the rotation angle of the flow splitter and the adjusting rotor. Therefore, the proportional valve as described above does not have the problems of spring elastic fatigue and reduced control accuracy, thereby greatly improving the lifespan of the proportional valve, and enabling the proportional valve to maintain high accuracy of fluid flow control after the proportional valve is used for many times.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
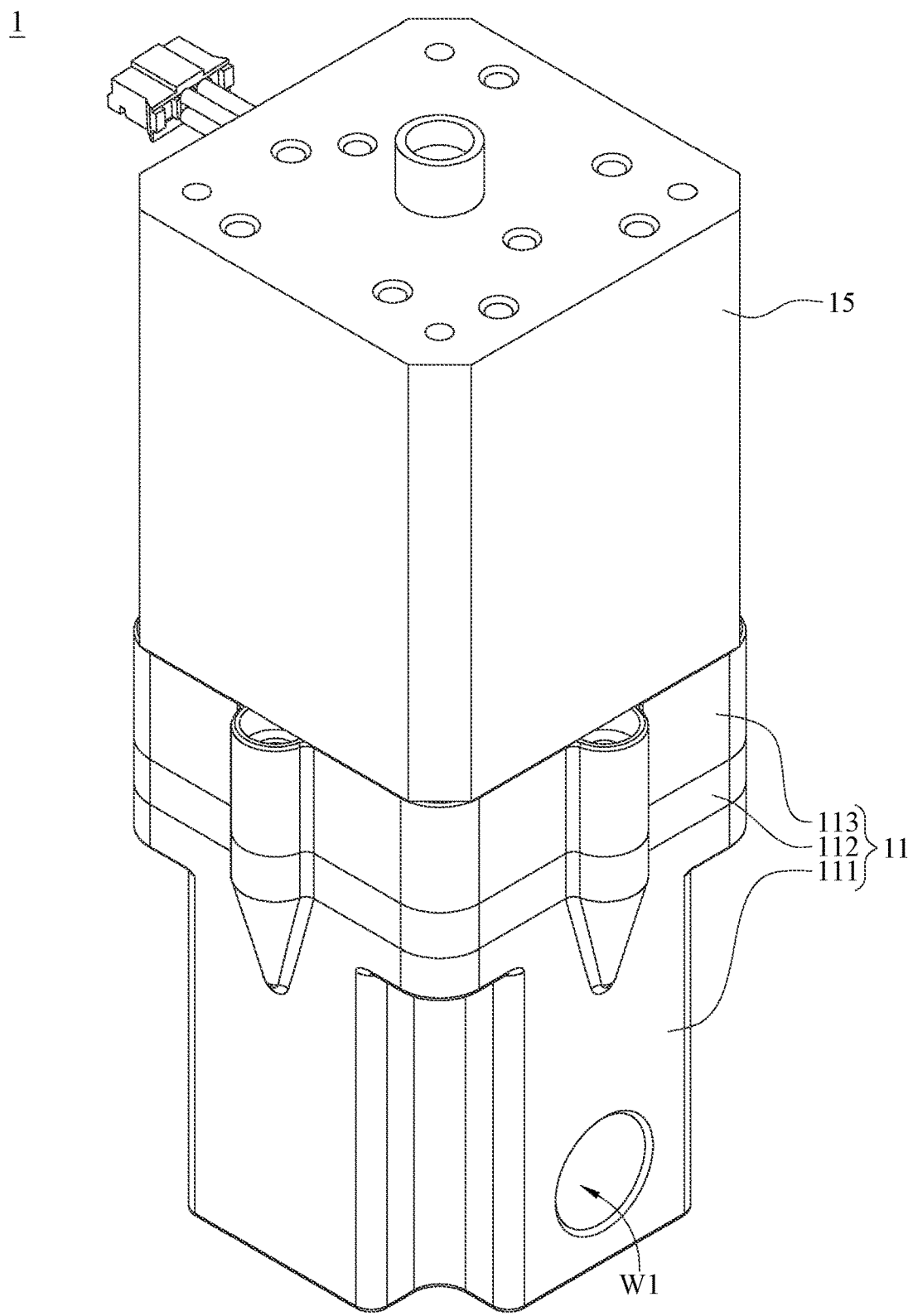
FIG. 1 is a perspective view of a proportional valve in accordance with an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
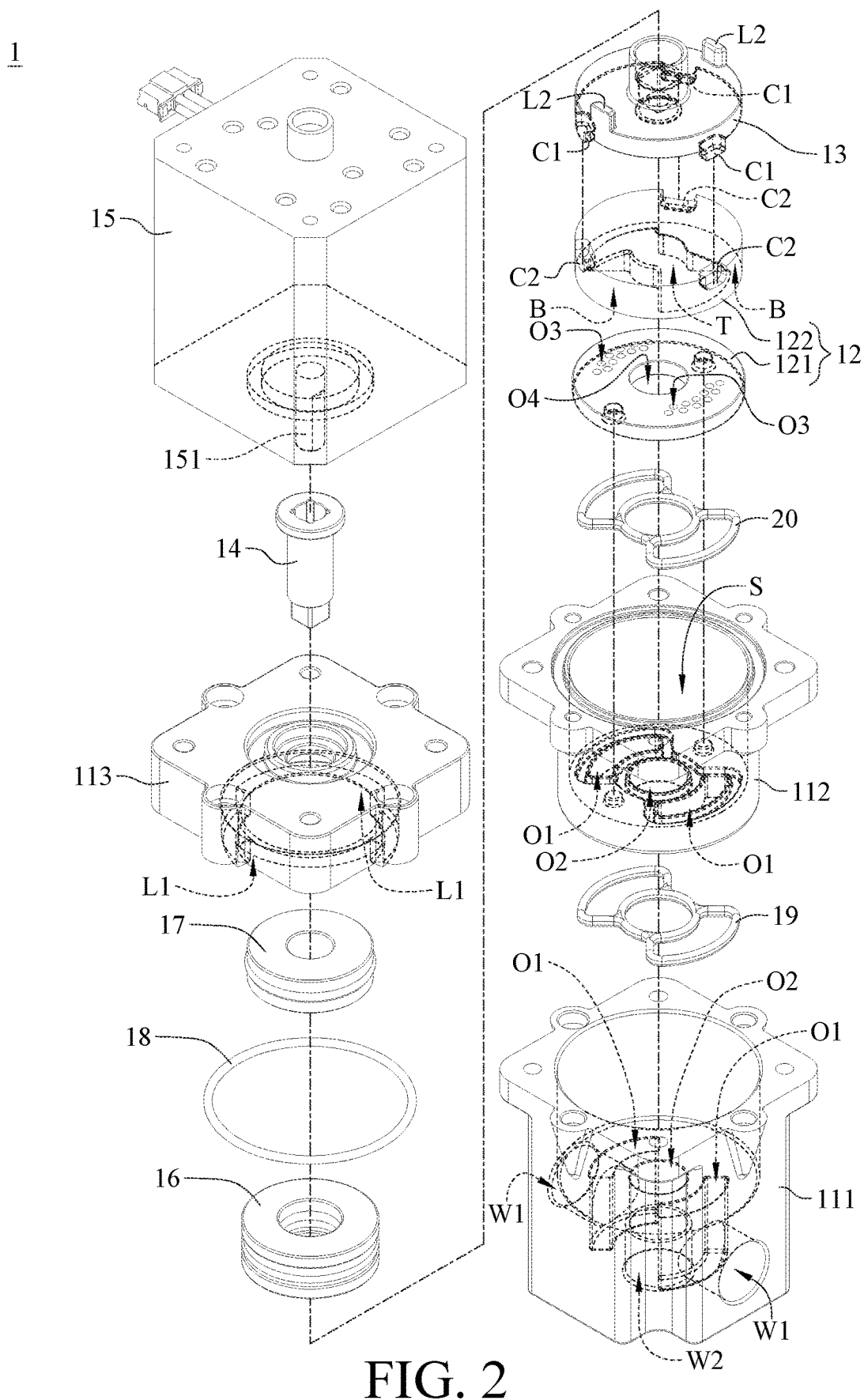
FIG. 2 is an exploded view of the proportional valve in FIG. 1.
Figure 3:
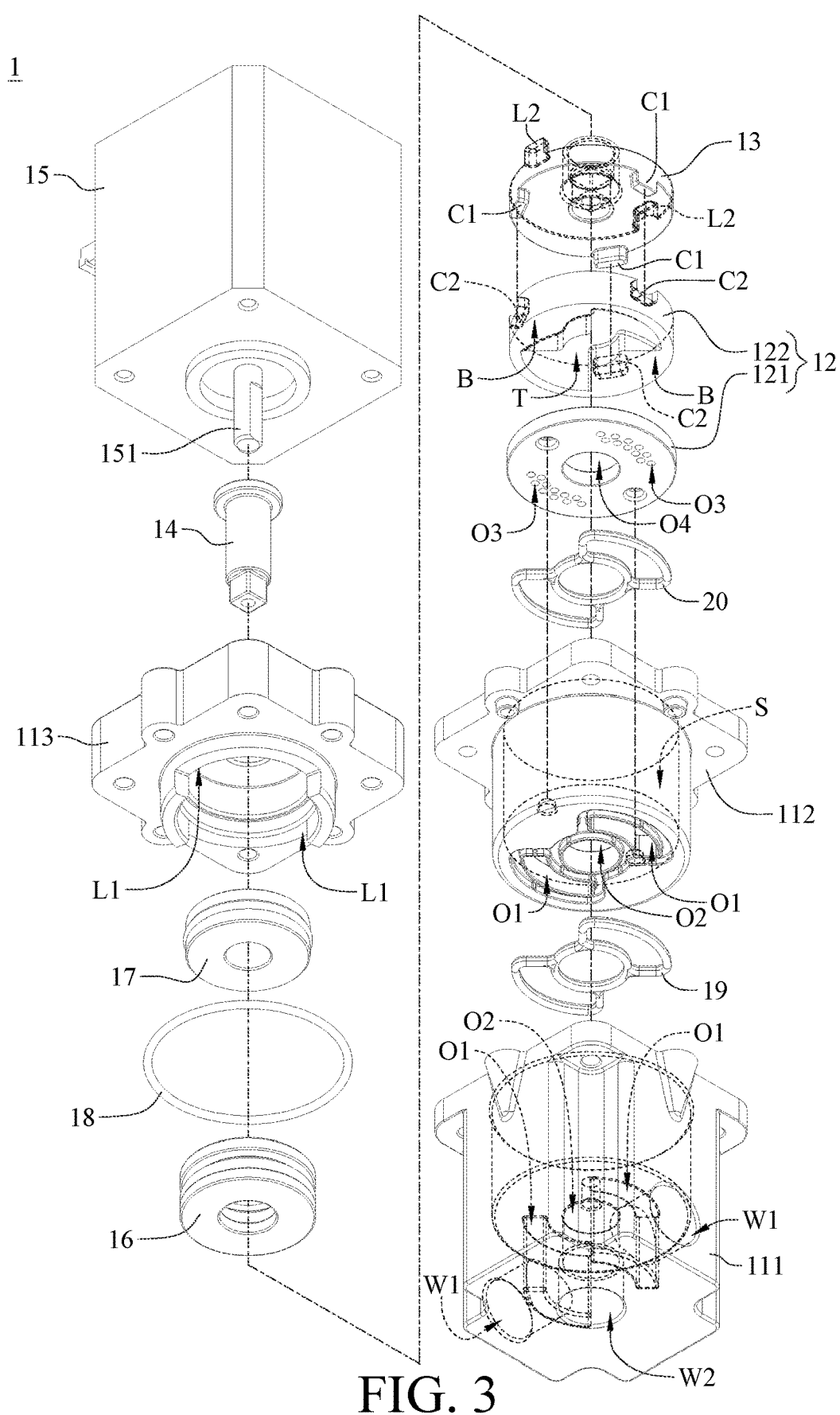
FIG. 3 is another exploded view of the proportional valve in FIG. 1.

Please refer to FIG. 1 to FIG. 3, where FIG. 1 is a perspective view of a proportional valve in accordance with an embodiment of the disclosure, and FIG. 2 is an exploded view of the proportional valve in FIG. 1, and FIG. 3 is another exploded view of the proportional valve in FIG. 1.

In this embodiment, the proportional valve 1 includes a casing 11 and a valve trim 12. The casing 11 includes a connecting seat 111, an accommodating seat 112 and a cover 113. The connecting seat 111 has two fluid inlets W1 and a fluid outlet W2. The shapes of the connecting seat 111 and the accommodating seat 112 are, for example, cup-shaped, and the accommodating seat 112 is slightly smaller than the connecting seat 111 in size. The accommodating seat 112 is stacked on the connecting seat 111, and a part of the accommodating seat 112 is surrounded by the connecting seat 111. The accommodating seat 112 has an accommodating space S. Each of two first connection passageways O1 and a second connection passageway O2 passes through the connecting seat 111 and the accommodating seat 112. The two first connection passageways O1 are respectively in fluid communication with the two fluid inlets W1. The second connection passageway O2 is in fluid communication with the fluid outlet W2. The accommodating space S is in fluid communication with the two first connection passageways O1 and the second connection passageway O2. The cover 113 covers the accommodating seat 112.

The valve trim 12 is located in the accommodating space S of the casing 11. The valve trim 12 has a flow splitter 121 and an adjusting rotor 122. The flow splitter 121 has two third connection passageways O3 and a fourth connection passageway O4. Each of the third connection passageways O3 is, for example, in a form of plural through holes. The two third connection passageways O3 are in fluid communication with the two first connection passageways O1. The fourth connection passageway O4 is in fluid communication with the second connection passageway O2. The adjusting rotor 122 has a channel T and a blocking portion B. The channel T is in fluid communication with the two third connection passageways O3 and the fourth connection passageway O4. The blocking portion B corresponds to the two third connection passageways O3. The adjusting rotor 122 is rotatably disposed on the flow splitter 121 so that the blocking portion B blocks a part of the two third connection passageways O3 to adjust an overlapping area between the channel T and the two third connection passageways O3, or specifically, an overlapping area between the channel T and the through holes. Accordingly, fluid is able to flow into the casing 11 via the two fluid inlets W1 and then flow out from the casing 11 sequentially via the two first connection passageways O1, the two third connection passageways O3, the channel T, the fourth connection passageway O4, the second connection passageway O2 and the fluid outlet W2. When the adjusting rotor 122 rotates relative to the flow splitter 121, the blocking portion B of the adjusting rotor 122 blocks part of the through holes of the two third connection passageways O3 fluid, thereby controlling the flow amount of the fluid.

In this embodiment, the proportional valve 1 further includes an axial thrust bearing 16. The axial thrust bearing 16 is located in the accommodating space S of the casing 11 and stacked on a side of an adapter 13 away from the adjusting rotor 122. The axial thrust bearing 16 can bear the axial force applied on the proportional valve 1, so as to reduce the friction between the components of the proportional valve 1 during operation of the proportional valve 1.

In this embodiment, the proportional valve 1 further includes a shaft seal 17. The shaft seal 17 is located in the accommodating space S of the casing 11. The shaft seal 17 is sleeved on a shaft 14 and stacked on the side of the axial thrust bearing 16 away from the adjusting rotor 122. Accordingly, the fluid at the shaft 14 can be prevented from leaking out of the casing 11 by the arrangement of the shaft seal 17.

In this embodiment, the proportional valve 1 further includes a first seal 18. The first seal 18 is clamped between the cover 113 and the accommodating seat 112 and surrounds the accommodating space S. Accordingly, the first seal 18 can improve the sealing effect of the casing 11 and prevent the fluid from leaking out of the accommodating space S.

In this embodiment, the proportional valve 1 further includes a second seal 19 and a third seal 20. The second seal 19 is clamped between the connecting seat 111 and the accommodating seat 112 and surrounds the two first connection passageways O1 and the second connection passageway O2. The third seal 20 is clamped between the accommodating seat 112 and the flow splitter 121 and surrounds the two first connection passageways O1 and the second connection passageway O2. Accordingly, the second seal 19 and the third seal 20 can improve the sealing effect of the casing 11 and prevent the fluid from leaking out of the two first connection passageways O1 and the second connection passageway O2.

Figure 4:
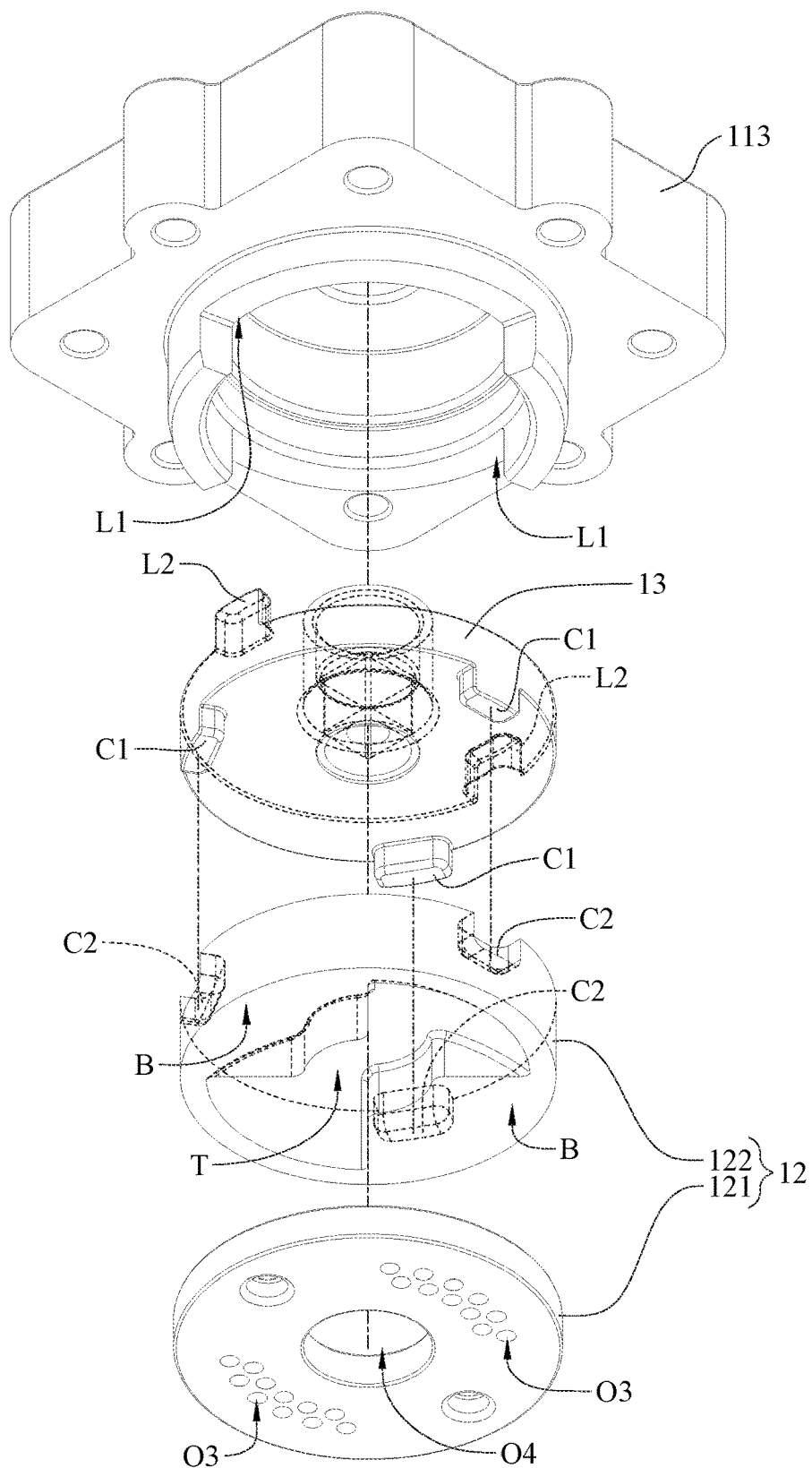
FIG. 4 is a partial and exploded view of the proportional valve in FIG. 1.

Please refer to FIG. 3 and FIG. 4, where FIG. 3 is another exploded view of the proportional valve in FIG. 1, and FIG. 4 is a partial and exploded view of the proportional valve in FIG. 1.

In this embodiment, the proportional valve 1 further includes the adapter 13, the shaft 14 and a driver 15. The adapter 13 has three first engagement portions C1, and the three first engagement portions C1 are parts of the adapter 13 protruded outwardly. The adjusting rotor 122 has three second engagement portions C2, and the three second engagement portions C2 are parts of the adjusting rotor 122 recessed inwardly. The three first engagement portions C1 and the three second engagement portions C2 are matched in structure by one is a convex structure and the other one is a concave structure, and the three second engagement portions C2 are engaged with the three first engagement portions C1. The driver 15 includes an output shaft 151. The driver 15 is, for example, a motor. The output shaft 151 of the driver is connected to the shaft 14, and the shaft 14 is connected to the adapter 13, so that the output shaft 151 of the driver 15 drives the adapter 13 to rotate via the shaft 14. Accordingly, with the engagement between the first engagement portions C1 of the adapter 13 and the second engagement portions C2 of the adjusting rotor 122 and the rotation of the adapter 13 driven by the driver 15, the adjusting rotor 122 can control the flow by blocking or not blocking the third connection passageways O3 of the flow splitter 121.

In this embodiment, the cover 113 of the proportional valve 1 further has two first limiting structures L1, and the two first limiting structures L1 are parts of the cover 113 recessed inwardly. The adapter 13 has two second limiting structures L2, and the two second limiting structures L2 are parts of the adapter 13 protruded outwardly. The two first limiting structures L1 are larger than the two second limiting structures L2 in size. The two second limiting structures L2 can be placed into the two first limiting structures L1, and the two second limiting structures L2 are rotatable relative to the two first limiting structures L1. Accordingly, the rotation range of the two second limiting structures L2 is limited within the two first limiting structures L1, so the rotation angle of the adapter 13 is also limited within the range of the two first limiting structures L1.

Figure 5:
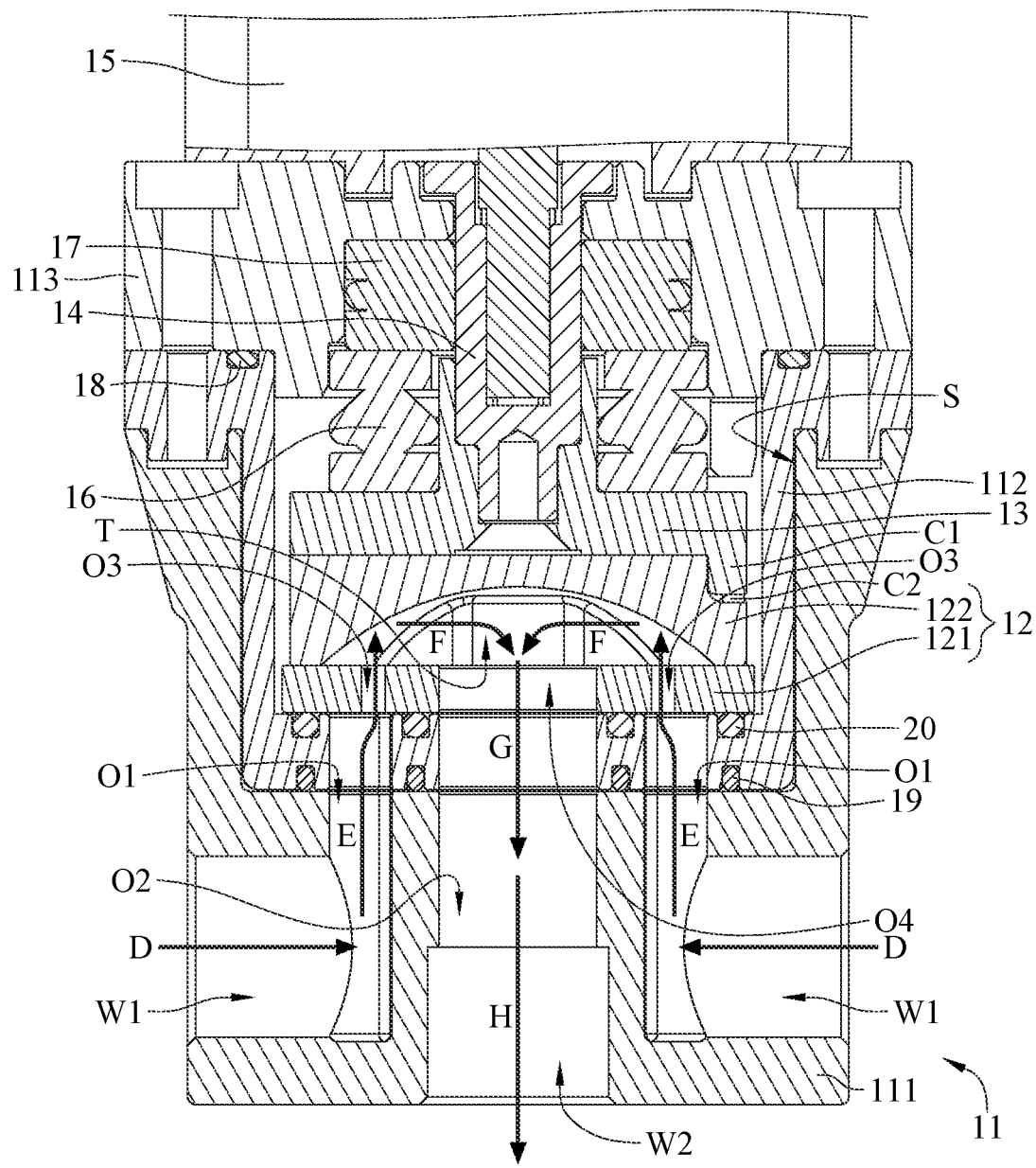
FIG. 5 is a partial and cross-sectional view of the proportional valve in FIG. 1 when a valve trim thereof is in an open state.
Figure 6:
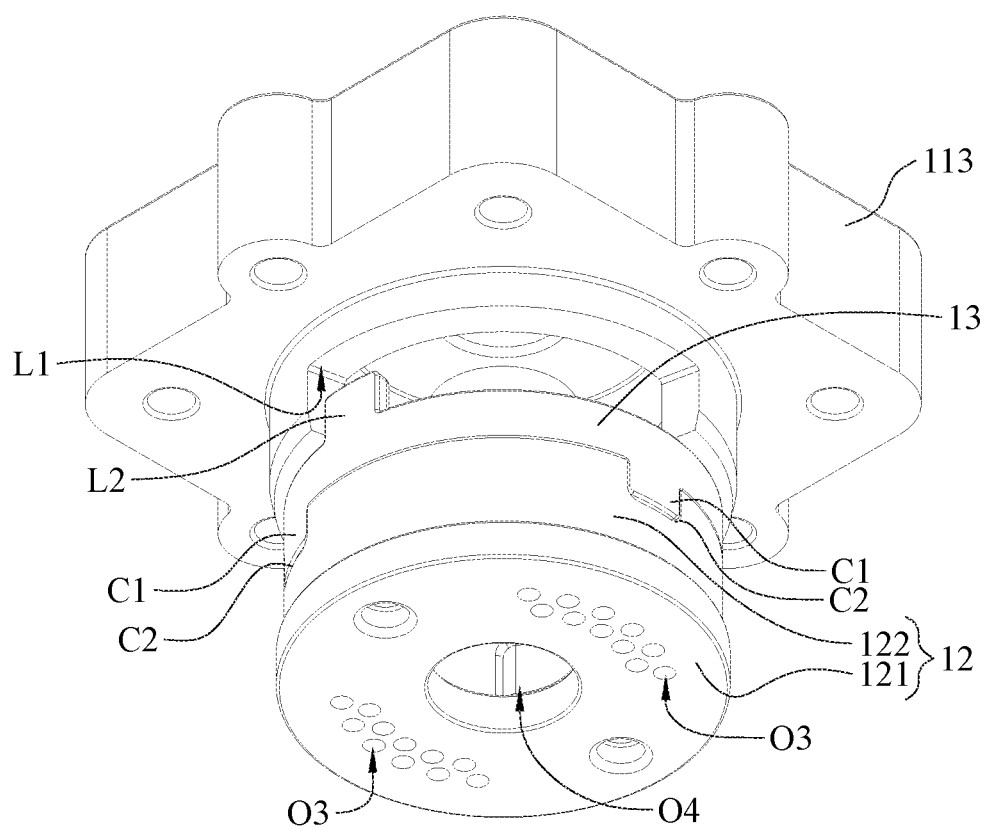
FIG. 6 is a partial perspective view of the proportional valve in FIG. 5.
Figure 7:
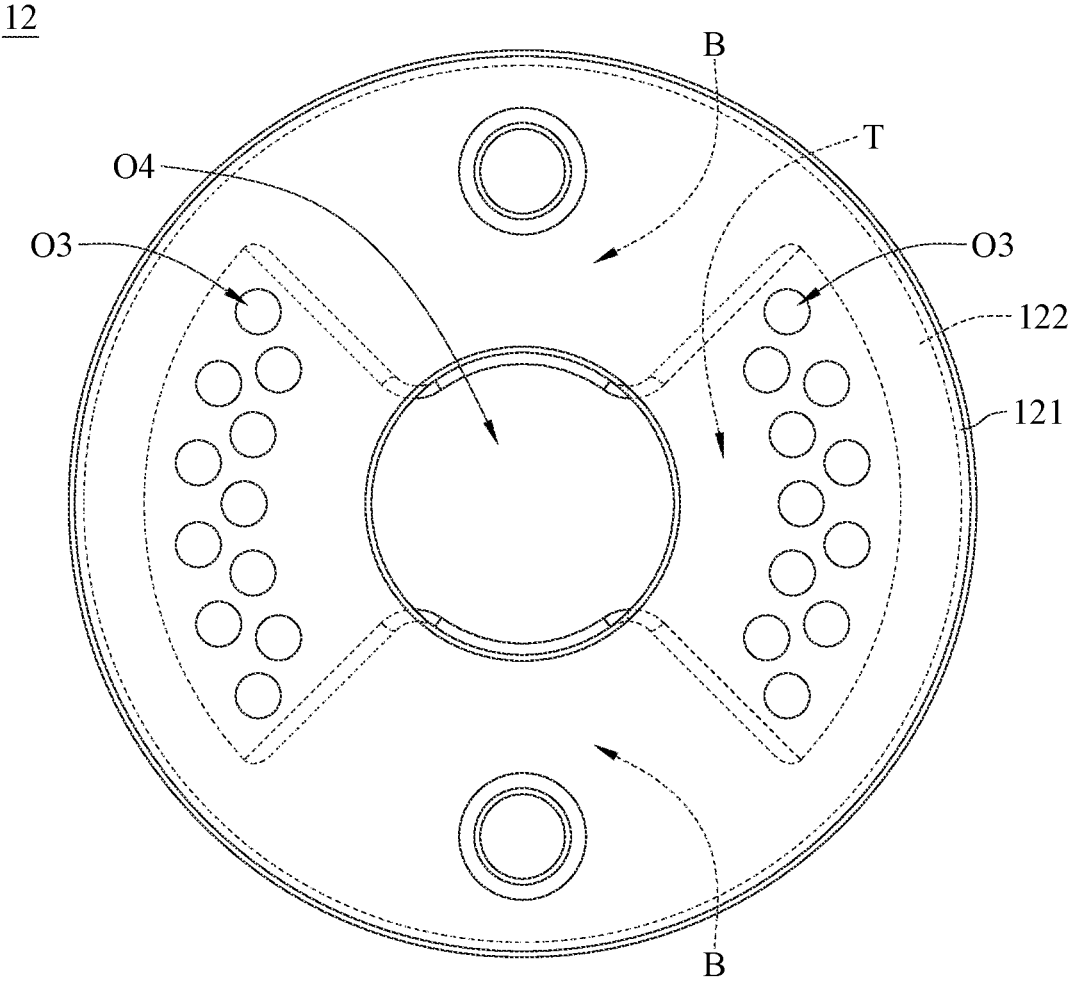
FIG. 7 is a bottom view of a flow splitter and an adjusting rotor of the proportional valve in FIG. 5.

Please refer to FIG. 5 to FIG. 7, where FIG. 5 is a partial and cross-sectional view of the proportional valve in FIG. 1 when a valve trim thereof is in an open state, and FIG. 6 is a partial perspective view of the proportional valve in FIG. 5, and FIG. 7 is a bottom view of a flow splitter and an adjusting rotor of the proportional valve in FIG. 5.

In this embodiment, the second limiting structures L2 of the adapter 13 are located on a side of the first limiting structures L1 of the cover 113, so that the blocking portion B of the adjusting rotor 122 does not block the two second third connection passageways O3 of the flow splitter 121. Therefore, the valve trim 12 of the proportional valve 1 is in the open state. The two fluid inlets W1, the two first connection passageways O1, the two third connection passageways O3, the fourth connection passageway O4, the second connection passageway O2 and the fluid outlet W2 can form a fluid passage in which fluid can smoothly flow. Specifically, the fluid is able to flow into the casing 11 via the two fluid inlets W1 along the direction D, then flow into the channel T via the two first connection passageways O1 and the two third connection passageways O3 along the direction E, and then flow toward the fourth connection passageway O4 in the channel T along the direction F, then pass through the fourth connection passageway O4 along the direction G, and finally flow out of the casing 11 via the fluid outlet W2 along the direction H.

Figure 8:
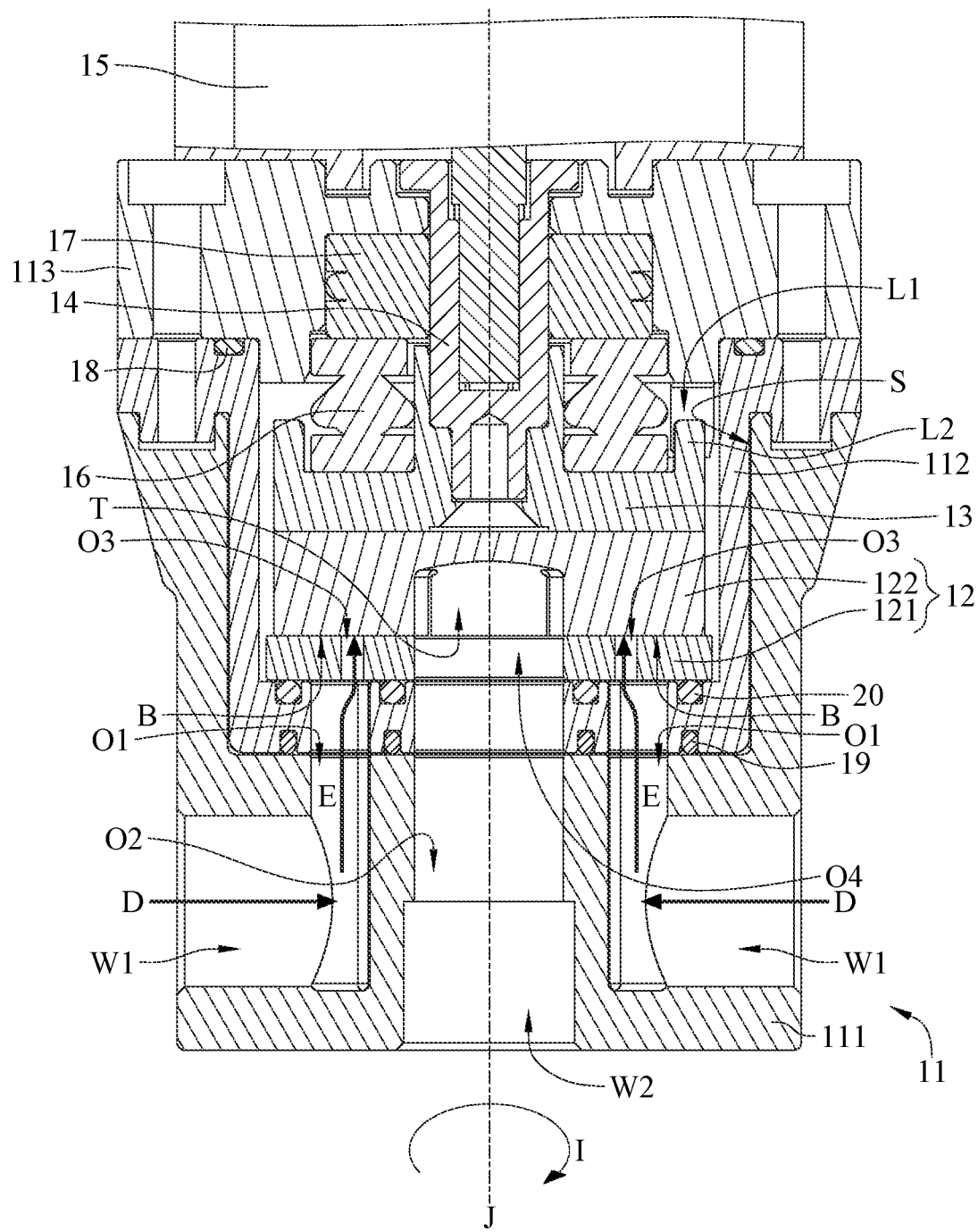
FIG. 8 is a partial cross-sectional view of the proportional valve in FIG. 1 when a valve trim thereof is in a closed state.
Figure 9:
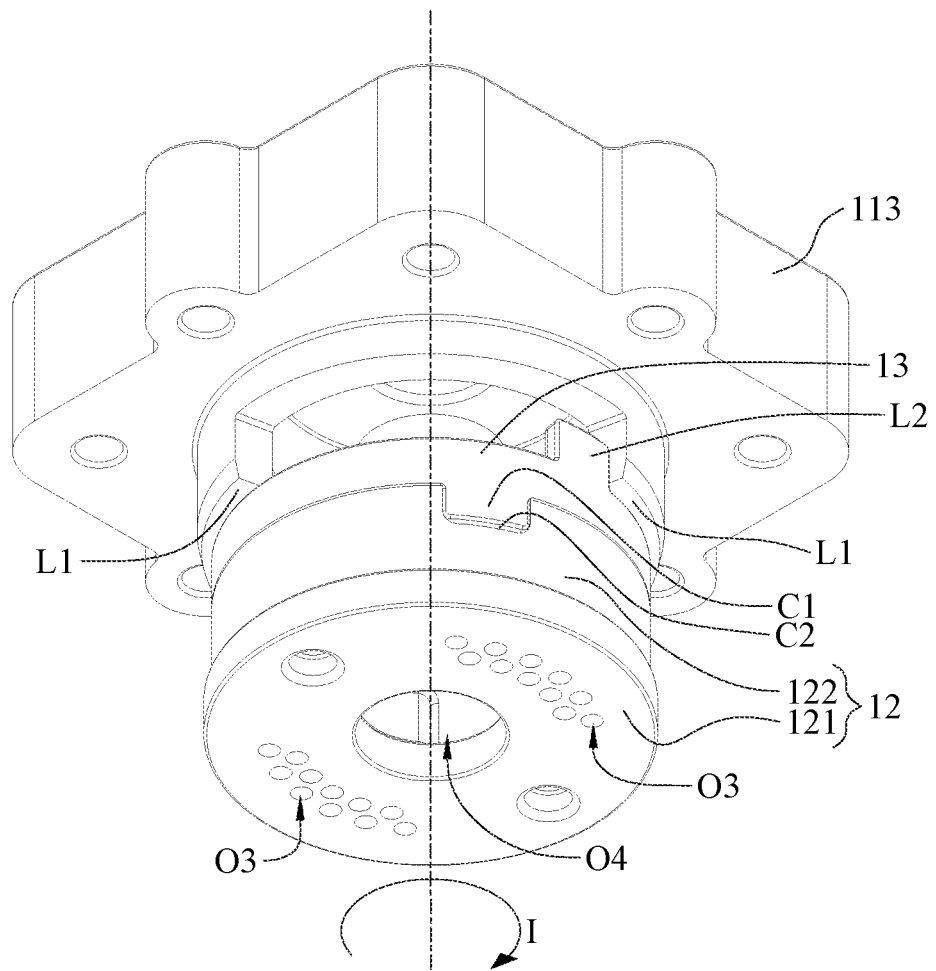
FIG. 9 is a partial perspective view of the proportional valve in FIG. 8.
Figure 10:
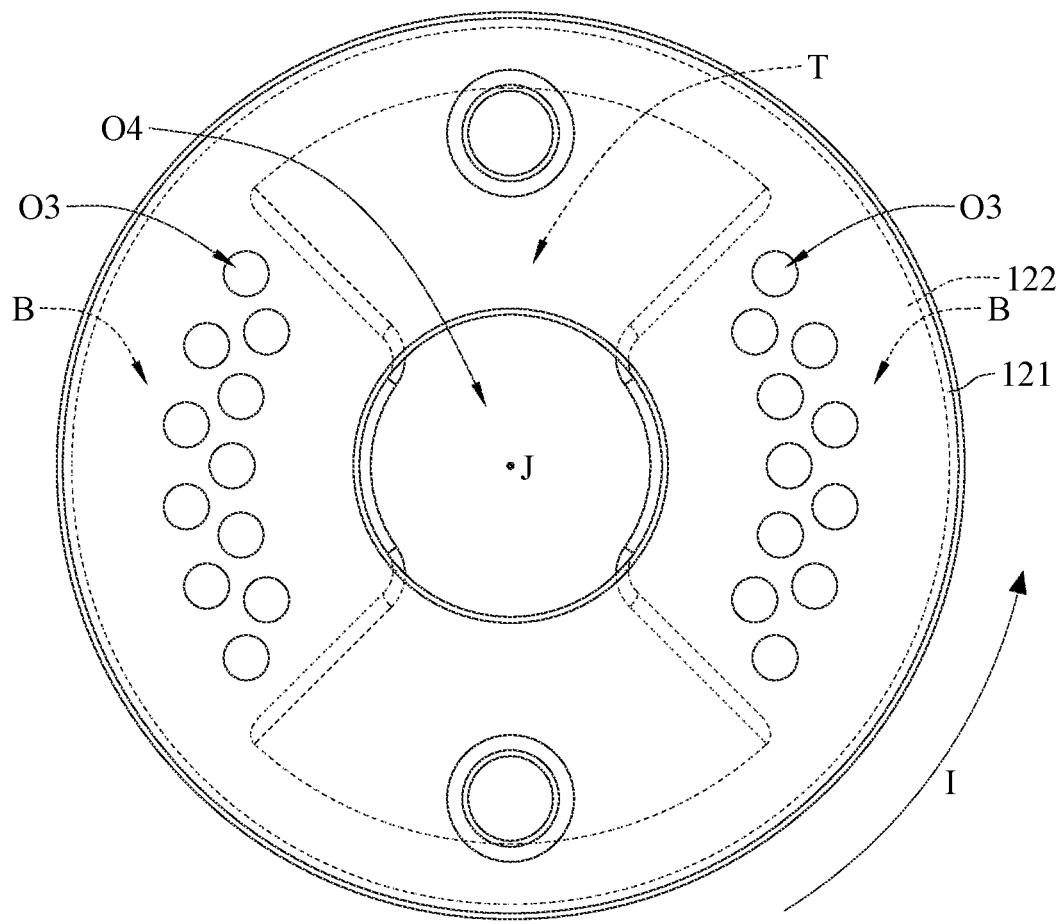
FIG. 10 is a bottom view of the flow splitter and the adjusting rotor of the proportional valve in FIG. 8.

Please refer to FIG. 8 to FIG. 10, where FIG. 8 is a partial cross-sectional view of the proportional valve in FIG. 1 when a valve trim thereof is in a closed state, and FIG. 9 is a partial perspective view of the proportional valve in FIG. 8, and FIG. 10 is a bottom view of the flow splitter and the adjusting rotor of the proportional valve in FIG. 8.

In this embodiment, the output shaft 151 of the driver 15 is connected to the shaft 14 for transmitting the driving force of the driver 15 to the adapter 13, so that the second limiting structures L2 of the adapter 13 rotate about an axis J by an angle, for example, 90 degrees, along the direction I within the limiting range of the first limiting structures L1 of the cover 113. When the adapter 13 rotates, since the first engagement portions C1 of the adapter 13 are engaged with the second engagement portions C2 of the adjusting rotor 122, the adapter 13 can drive the adjusting rotor 122 to rotate, so that the blocking portion B of the adjusting rotor 122 is rotated from the open state of the valve trim 12 of the proportional valve 1 to the closed state of the valve trim 12 of the proportional valve 1. The rotated blocking portion B blocks the two third connection passageways O3 of the flow splitter 121, and the blocking portion B blocks the fluid communication between the third connection passageways O3 and the channel T, so that after the fluid flows through the two fluid inlets W1 along the direction D and flows through the two first connection passageways O1 along the direction E, the fluid is blocked at the two third connection passageways O3 and cannot continue to flow.

In this embodiment, when the blocking portion B of the adjusting rotor 122 is rotated about the axis J along the direction I from the open state of the valve trim 12 of the proportional valve 1 to the closed state of the valve trim 12 of the proportional valve 1, the area of the two third connection passageways O3 of the flow splitter 121 blocked by the blocking portion B gradually increases, and the fluid flow will gradually decrease. Therefore, the proportional valve 1 can adjust the fluid flow via the adjusting rotor 122 and the flow splitter 121.

In this embodiment, when the blocking portion B of the adjusting rotor 122 does not block the third connection passageways O3, the third connection passageways O3, the channel T and the fourth connection passageway O4 form a fluid passage, so that the fluid can flow there through. When the blocking portion B of the adjusting rotor 122 blocks the third connection passageways O3, the blocking portion B blocks the fluid communication between the third connection passageway O3, the channel T and the fourth connection passageway O4, so that the fluid cannot flow there through. By disposing the flow splitter 121 and the adjusting rotor 122 in the proportional valve 1 to control the fluid flow in the proportional valve 1 instead of the conventional spring, the control accuracy of the fluid flow can be prevented from being affected by the elastic fatigue of the spring, so that the lifespan of proportional valve 1 can be greatly increased.

In this embodiment, the two third connection passageways O3 are in a form of plural through holes, and several of the through holes is blocked by the adjusting rotor 122 for adjusting the flow amount there through. However, the present disclosure is not limited thereto. In some other embodiments, the two third connection passageways may be in a form of single through hole, and part of the through hole is blocked by the adjusting rotor 122 for adjusting the flow amount there through.

In this embodiment, the two fluid inlets W1 are respectively located on two opposite sides of the fluid outlet W2, but the present disclosure is not limited thereto. In some other embodiments, the two fluid inlets may be located on adjacent sides of the fluid outlet.

In this embodiment, each of the quantities of the fluid inlets W1, the first connection passageways O1, the third connection passageways O3 and the blocking portions B is two, but the present disclosure is not limited thereto. In some other embodiments, each of the quantities of the fluid inlets, the first connection passageways, the third connection passageways and the blocking portions may be one or more than two.

In this embodiment, each of the quantities of the fluid outlet W2, the second connection passageway O2 and the fourth connection passageway O4 is one, but the present disclosure is not limited thereto. In some other embodiments, each of the quantities of the fluid outlet, the second connection passageway and the fourth connection passageway may be more than one.

In this embodiment, the three first engagement portions C1 are parts of the adapter 13 protruded outwardly, and the three second engagement portions C2 are parts of the adjusting rotor 122 recessed inwardly, but the present disclosure is not limited thereto. In some other embodiments, the three first engagement portions may be parts of the adapter recessed inwardly, and the three second engagement portions may be parts of the adjusting rotor 122 protruded outwardly.

In this embodiment, each of the quantities of the first engagement portions C1 and the second engagement portions C2 is three, but the present disclosure is not limited thereto. In some other embodiments, each of the quantities of the first engagement portions and the second engagement portions may be one, two or more than three.

In this embodiment, each of the quantities of the first limiting structures L1 and the second limiting structures L2 is two, but the present disclosure is not limited thereto. In some other embodiments, each of the quantities of the first limiting structures and the second limiting structures may be one or more than two.

According to the proportional valve as described above, it adjusts the fluid flow via the flow splitter and the adjusting rotor thereof. When the blocking portion of the adjusting rotor does not block the at least one third connection passageway, the at least one fluid inlet, the at least one first connection passageway, the at least one third connection passageway, the at least one fourth connection passageway, the at least one second connection passageway and the fluid outlet can form a fluid passage, such that the fluid can flow smoothly. When the blocking portion of the adjusting rotor blocks the two third connection passageways, the blocking portion blocks the fluid communication between the third connection passageway and the channel, so that the fluid cannot flow through. Compared with the conventional proportional valve that uses the elastic force of the spring to control the opening degree of the valve trim, the proportional valve as described above does not use the elastic force of the spring to control the opening degree of the valve trim, but controls the opening degree of the valve trim via the rotation angle of the flow splitter and the adjusting rotor. Therefore, the proportional valve as described above does not have the problems of spring elastic fatigue and reduced control accuracy, thereby greatly improving the lifespan of the proportional valve, and enabling the proportional valve to maintain high accuracy of fluid flow control after the proportional valve is used for many times.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A proportional valve, comprising:
   a casing, having at least one fluid inlet, a fluid outlet, at least one first connection passageway, at least one second connection passageway and an accommodating space, wherein the at least one first connection passageway is in fluid communication with the fluid inlet, the at least one second connection passageway is in fluid communication with the fluid outlet, and the accommodating space is in fluid communication with the at least one first connection passageway and the at least one second connection passageway; and
   a valve trim, located in the accommodating space of the casing, comprising:
      a flow splitter, having two third connection passageways and at least one fourth connection passageway, wherein the two third connection passageways are in fluid communication with the at least one first connection passageway, and the at least one fourth connection passageway is in fluid communication with the at least one second connection passageway;
      an adjusting rotor having a channel and two blocking portions, and being configured such that, when bisected, the adjusting rotor provides two symmetrical halves, wherein the channel is in fluid communication with the two third connection passageways and the at least one fourth connection passageway, each of the two blocking portions corresponds to a respective third connection passageway, and the adjusting rotor is rotatably disposed on the flow splitter so that each of the two blocking portions blocks a part of the respective third connection passageway to adjust an overlapping area between the channel and the respective third connection passageway.

2. The proportional valve according to claim 1, wherein the casing comprises a connecting seat, an accommodating seat and a cover, wherein the accommodating seat is stacked on the connecting seat and a part of the accommodating seat is surrounded by the connecting seat, the cover covers the accommodating seat, the at least one fluid inlet and the fluid outlet are located on the connecting seat, each of the at least one first connection passageway and the at least one second connection passageway passes through the connecting seat and the accommodating seat, and the accommodating space is located in the accommodating seat.

3. The proportional valve according to claim 2, further comprising an adapter, a shaft and a motor, wherein the adapter has at least one first engagement portion, the adjusting rotor has at least one second engagement portion, the at least one first engagement portion and the at least one second engagement portion are matched in structure, the at least one second engagement portion is engaged with the at least one first engagement portion, and the motor is connected to the adapter via the shaft so as to rotate the adapter.

4. The proportional valve according to claim 3, wherein the cover has at least one first limiting structure, the adapter has at least one second limiting structure, the at least one second limiting structure is rotatable relative to the at least one first limiting structure, and the at least one second limiting structure is matched to the at least one first limiting structure to limit a rotation angle of the adapter.

5. The proportional valve according to claim 3, further comprising an axial thrust bearing, wherein the axial thrust bearing is located in the accommodating space of the casing and stacked on a side of the adapter away from the adjusting rotor.

6. The proportional valve according to claim 5, further comprising a shaft seal, wherein the shaft seal is located in the accommodating space of the casing, sleeved on the shaft and stacked on a side of the axial thrust bearing away from the adjusting rotor.

7. The proportional valve according to claim 2 wherein a first seal is clamped between the cover and the accommodating seat and surrounds the accommodating space.

8. The proportional valve according to claim 7, wherein a second seal is clamped between the connecting seat and the accommodating seat and surrounds the at least one first connection passageway and the at least one second connection passageway, and a third seal is clamped between the accommodating seat and the flow splitter and surrounds the at least one first connection passageway and the at least one second connection passageway.

9. The proportional valve according to claim 1, further comprising a driver, wherein the driver is connected to the adjusting rotor and configured to rotate the adjusting rotor relative to the flow splitter.

10. The proportional valve according to claim 1, wherein each of the two third connection passageways is in a form of single through hole.

11. The proportional valve according to claim 1, wherein each of the two third connection passageways is in a form of plural through holes.

12. The proportional valve according to claim 1, wherein a quantity of each of the at least one fluid inlet, and the at least one first connection passageway, and the two fluid inlets are respectively located on two opposite sides of the fluid outlet.

* * * * *